(12) United States Patent
Hegarty

(10) Patent No.: US 9,395,161 B1
(45) Date of Patent: *Jul. 19, 2016

(54) AEROSOL FLUID DETERRENT SYSTEM

(71) Applicant: Harry E. Hegarty, Bellingham, WA (US)

(72) Inventor: Harry E. Hegarty, Bellingham, WA (US)

( * ) Notice: Subject to any disclaimer, the term of this patent is extended or adjusted under 35 U.S.C. 154(b) by 160 days.

This patent is subject to a terminal disclaimer.

(21) Appl. No.: 14/165,024

(22) Filed: Jan. 27, 2014

Related U.S. Application Data

(63) Continuation-in-part of application No. 13/709,865, filed on Dec. 10, 2012.

(60) Provisional application No. 61/568,405, filed on Dec. 8, 2011.

(51) Int. Cl.
| | |
|---|---|
| *A62C 15/00* | (2006.01) |
| *B05B 9/08* | (2006.01) |
| *F41H 9/10* | (2006.01) |
| *A01M 29/00* | (2011.01) |
| *A01K 15/02* | (2006.01) |
| *A01M 29/12* | (2011.01) |
| *B62J 11/00* | (2006.01) |
| *B62J 99/00* | (2009.01) |

(52) U.S. Cl.
CPC .............. *F41H 9/10* (2013.01); *A01K 15/023* (2013.01); *A01M 29/00* (2013.01); *A01M 29/12* (2013.01); *B62J 11/00* (2013.01); *B62J 99/00* (2013.01); *B62J 2099/0086* (2013.01)

(58) Field of Classification Search
CPC ..... A01K 15/023; A01M 29/00; A01M 29/12
USPC ................. 239/154, 172, 289, 373; 224/414; 222/610
See application file for complete search history.

(56) References Cited

U.S. PATENT DOCUMENTS

| | | | |
|---|---|---|---|
| 3,677,446 | A | 7/1972 | Guyer, Jr. et al. |
| 4,209,113 | A | 6/1980 | Kuna |
| 4,807,813 | A | 2/1989 | Coleman |
| 4,828,177 | A | 5/1989 | Schuitemaker |
| 4,911,339 | A | 3/1990 | Cushing |
| 5,009,192 | A | 4/1991 | Burman |
| 5,158,218 | A | 10/1992 | Wery |
| 5,501,179 | A | 3/1996 | Cory |
| 5,607,087 | A | 3/1997 | Wery et al. |
| D381,711 | S | 7/1997 | Englert |
| 5,735,440 | A | 4/1998 | Regalbuto |

(Continued)

*Primary Examiner* — Len Tran
*Assistant Examiner* — Alexander Valvis
(74) *Attorney, Agent, or Firm* — Dwayne E. Rogge; Schacht Law Office, Inc.

(57) ABSTRACT

An animal and attacker deterrent system to be mounted to a bicycle or to an similar vehicle is disclosed herein. The deterrent system in one example comprises a compressed gas cylinder where the gas includes a chemical animal deterrent and a carrier. In one example the system utilizes a user-actuated valve coupled to the compressed gas cylinder. The actuator for the valve mounted within easy reach of the user (vehicle operator) such as mounted to the bicycle handlebars. The system in one example comprises a short gas conduit having a first end coupled to the user-actuated valve and a second end fluidly coupled to a plurality of mist producing spray apertures.

6 Claims, 2 Drawing Sheets

(56) References Cited

U.S. PATENT DOCUMENTS

| | | |
|---|---|---|
| 5,755,368 A | 5/1998 | Bekkedahl |
| 6,196,474 B1 | 3/2001 | Hillerson |
| 6,722,679 B2 | 4/2004 | Englert |
| 6,953,135 B2 | 10/2005 | Litton et al. |
| 6,966,502 B2 | 11/2005 | Wilt |
| 7,458,528 B2 | 12/2008 | Ridgeway et al. |
| 8,714,464 B2 | 5/2014 | Carrozza et al. |
| 2005/0145162 A1 | 7/2005 | Marcus |
| 2009/0236815 A1 | 9/2009 | O'Toole |
| 2013/0140377 A1 | 6/2013 | Carrozza et al. |

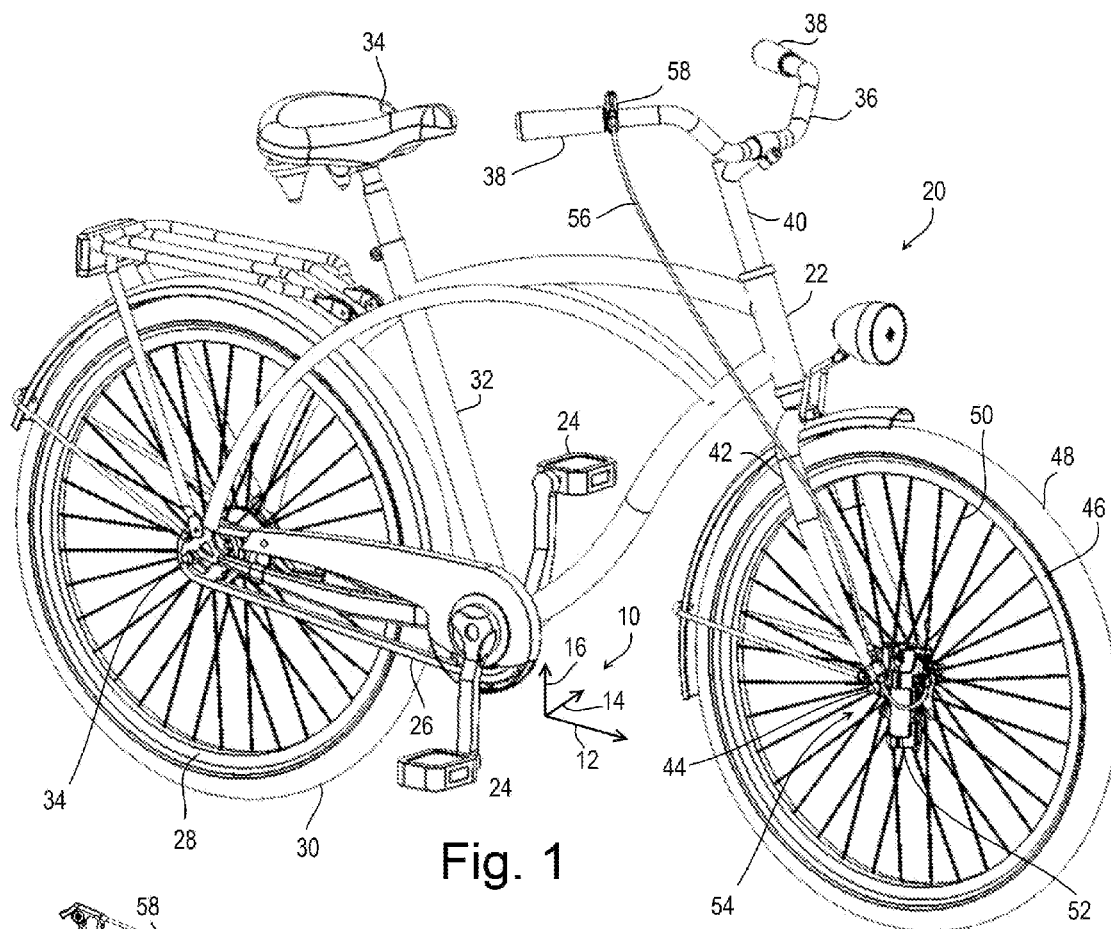
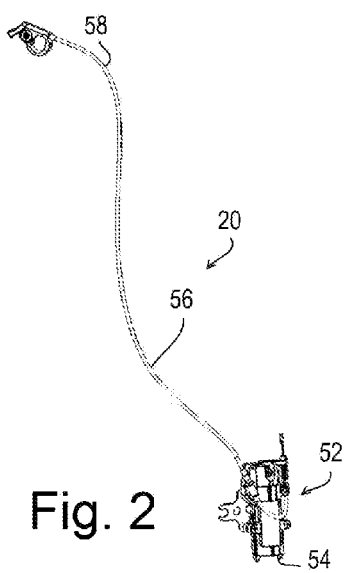
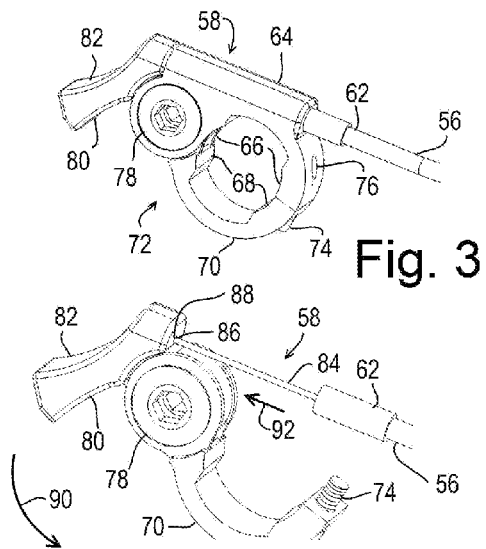
Fig. 1
Fig. 2
Fig. 3
Fig. 4

AEROSOL FLUID DETERRENT SYSTEM

RELATED APPLICATIONS

This application includes advances and improvements over U.S. Ser. No. 13/709,865, filed Dec. 10, 2012 claiming priority of U.S. Ser. No. 61/568,405 filed Dec. 8, 2011 incorporated herein by reference.

BACKGROUND OF THE DISCLOSURE

Field of the Disclosure

This disclosure relates to the field of pressurized fluid misting device to be mounted to a bicycle or similar vehicle wherein the fluid misting device has a pressurized portion, and a user-actuated valve for release of the fluid through at least one misting orifice to produce a fine "cloud" of the animal deterrent fluid.

BRIEF SUMMARY OF THE DISCLOSURE

An animal and attacker deterrent system to be mounted to a bicycle or to a similar vehicle is disclosed herein. The deterrent system in one example comprises a compressed gas cylinder where the gas includes a chemical animal deterrent and a carrier. In one example the system utilizes a user-actuated valve coupled to the compressed gas cylinder. The actuator for the valve mounted within easy reach of the user (vehicle operator) such as mounted to the bicycle handlebars. The system in one example comprises a short gas conduit having a first end coupled to the user-actuated valve and a second end fluidly coupled to a plurality of mist producing spray apertures.

The overall desired outcome is to provide a mist cloud of the aeseloated deterrent gas between the user/rider and any attacking animal. In such a condition, the animal will be deterred from attacking the rider.

BRIEF DESCRIPTION OF THE SEVERAL VIEWS OF THE DRAWINGS

FIG. 1 is a side isometric view of one example of the aerosol fluid deterrent system attached to a bicycle.

FIG. 2 is a side isometric view of one example of the aerosol fluid deterrent system.

FIG. 3 is a detail enlarged view of one example of the user actuator portion of the system shown in FIG. 1.

FIG. 4 is a detail enlarged view of the device shown in FIG. 3 with a portion of the housing removed to show the internal cable.

DETAILED DESCRIPTION OF THE DISCLOSURE

Figure 5:
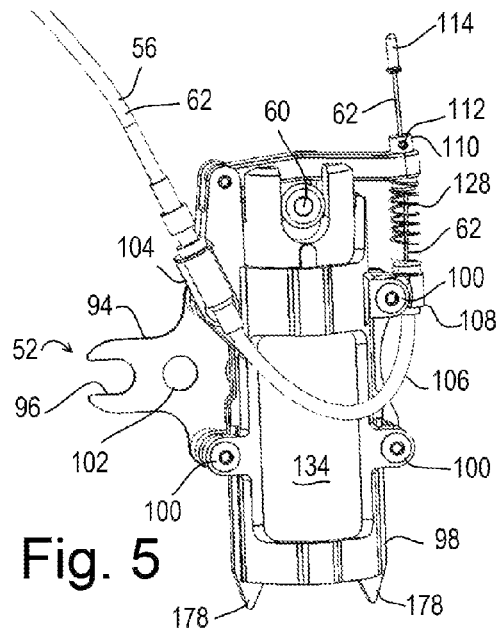
FIG. 5 is a detail enlarged view of one example of the delivery system portion of the system shown in FIG. 1.

Most people who have ridden a bicycle or similar user-powered vehicle in rural or residential areas has very likely encountered animals (mainly dogs) which have approached the rider with the intent of chasing, barking at, biting, or otherwise confronting (attacking) the bicyclist. Not only does the animal attack often directly result in injury to the bicycle rider, but the situation also diverts the rider's attention away from the roadway and traffic and may exacerbate the situation in that the rider may drive off of the roadway, or into traffic, and significantly injure themselves. Several deterrent methods have been employed, including yelling at the animal, kicking at the animal, carrying pepper spray or other directionally projected fluid, or noises such as whistles, horns, or bells. Many of these methods are very inefficient and may not significantly deter the animal. Furthermore whistles, horns, pepper sprays may require that the rider be further distracted from the roadway, and particularly in the case of directed pepper sprays, require that the rider remove at least one hand from the handlebars or other steering component to grasp the spray device, direct (aim) the spray device at the animal, and trigger a release mechanism. Pepper sprays also may be carried by the wind back toward the rider, causing pain, injury and further loss of attention. Thus a safe and efficient means for deterring animals while maintaining safety to the rider is greatly desired and as of yet has not been significantly achieved.

Additionally, devices have been created for spraying of the rider to provide a non-deterrent cooling or refreshing fluid to the rider. Obviously, such devices would generally water which would not significantly deter the attacking or chasing animal. Such devices may be deterrent (distracting) to the rider themself.

Before beginning a detailed description of the device and a method for operating the device disclosed herein, an axes system 10 is shown in FIG. 1 which generally comprises a longitudinal axis 12 and a transverse axes 14. In The longitudinal axis 14 is shown along with a vertical axis 16 which is generally orthogonal to both the transverse axes 12 and longitudinal axis 14. The longitudinal axis 14 shown in FIG. 1 generally points in a forward direction relative to the normal movement of the vehicle with the opposite direction being defined as reward direction, and the transverse axes 14 points in a leftward direction with the opposite direction being defined as a rightward direction. Similarly, the vertical axis 16, points in upward direction, with the opposite direction is generally defined as downward. These axes are intended for aid in describing the apparatus and system with the invention being defined by the claims below.

Additionally, a numbering system will be utilized wherein specific components use a single or double apostrophe to indicate for example right or left versions of a similar component. For example the spray apertures generally numbered 60 with the particular spray apertures 60' and 60" on right and left lateral sides respectively.

Looking to FIG. 1 is shown one example of a user-powered vehicle to which the aerosol fluid deterrent system 20 is removably mounted. This example of the user-powered vehicle is shown as a bicycle 22 having a pair of pedals 24 attached by way of a sprocket and chain 26 to a rear wheel 28 having a rear tire 30 thereupon to provide motive force to the vehicle and user(s). The rear wheel 28 is attached to a vehicle frame 32 at a rear axle 34. The user will generally sit or rest upon the seat 34. The user controls (steers) the direction of travel of the vehicle in motion in part by grasping the handlebars 36 at a grip portion 38 provided for each hand. The handlebars connected to a stem 40 connected in turn to a front fork 42 attached to the front wheel axle 44. The front wheel axle holding in place a front wheel 46 having a front tire 48 attached thereto. A plurality of front spokes 50 are shown in this example attaching the front wheel 46 rim to the front wheel axle 44 and hub. Such wheel axles generally comprise male threads on either lateral end with female threaded nuts attached thereto outward of the end of the front fork 42. Such user-powered vehicles are well-known in the art and this is just one example of such a vehicle.

In testing it is been shown that as the front spokes 50 (or equivalent rear spokes) obstruct a relatively small portion of the front wheel 46 inward of the rim, (especially when rotating) it is entirely possible to spray a mist of deterrent fluid there through. Therefore, in the example shown in FIG. 1, an example is shown where a single delivery sub-system 52 is removably mounted to the front wheel axle 44 so as to spray a deterrent missed laterally 14 leftwards through the front spokes 50 as well as n a rightward direction away from the front spokes 50. In this way, a single spray assembly 54 having a plurality of spray apertures 56 may be utilized coupled by way of a connector 56 to a user actuator 58.

The user actuator 58 in this example is mounted adjacent the handle bar grip portion 38 so as to be easily actuated such as by the users some without releasing the handle bars 36. The connector 56 in this example allows for remote actuation of the spray assembly 54. It is disclosed that the spray assembly 54 could equally be mounted to the frame 32 or the rear axle 34; however, testing has shown that mounting the sprayer apparatus to the front wheel axle 44 creates a superior dispersal pattern (cloud) around the user so as to provide maximum deterrent misting in the event of an attacking animal.

Looking to FIG. 2, the aerosol fluid deterrent system 20 is shown removed from the vehicle 22 to more easily illustrate how these portions may be connected to interoperate.

Looking to FIG. 3 the user actuator 58 is shown removed from the handlebars 36. As shown, the connector 56 comprises a cable cover 62, one end of which terminates at an upper housing 64. The upper housing of this example has an inner surface 66 which frictionally engages one portion of the handlebars 36, while an inner surface 68 of an opposing lower housing 70 engages another radially opposing portion of the handlebars 36. In this example, a hinge 72 attaches one end of the lower housing 70 to the upper housing 64 and a threaded screw 74 engages a threaded void 76 so as to apply clamping force between the user actuator 58 and the handlebars 36 or other portion of the vehicle to which the user actuator 58 is attached when the set screw is tensioned. Also shown is a pivot 78 connecting an engagement portion to the upper housing 64. In the example shown, the pivot 78 provides a dual function as the hinge 72. The engagement portion 80 having a user engagement surface 82 offset so that force engaged upon the user engagement surface will rotate the engagement portion 80 about the pivot 78.

FIG. 4 shows the apparatus of FIG. 3 with the upper housing 64 removed to more clearly show the internal components. In this example, the cable core 84 protrudes from the cable cover 62 through which the cable longitudinally slides. Such covered cable actuator connectors are well known for the manipulation of vehicle brakes, gear shifting, etc. The end 86 of the cable core 84 is attached to the engagement portion 80 at an attachment location 88. By so configuring the actuator, when enough pressure is exerted on the user engagement surface 82, the user engagement portion 80 will rotate in direction of travel 90 thus "pulling" the cable core 84 in direction of travel 92. Such movement will tend to actuate the spray assembly as will be disclosed.

Figure 7:
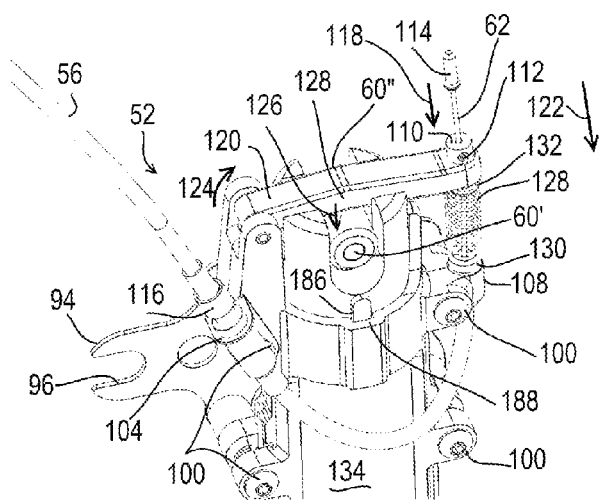
FIG. 7 is a detail view of the upper portion of the delivery system shown in FIG. 5.
Figure 10:
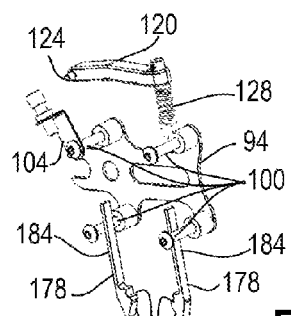
FIG. 10 is a hidden line view of the spray nozzle component of the delivery system shown in FIG. 5.

Looking to FIG. 7 is shown the uppermost portion of the delivery system 52 with the connector 56 attached thereto. Included in this example is a mounting bracket 94 having an open region forming an axle mount 96 for attachment to the front wheel axle 44 in one example or alternatively for attachment to the rear axle 34, or other portions of the vehicle 22. When panniers are used, it may be desired to mount the spray apparatus transversely external of the panniers. In the example shown in the drawings, the mounting bracket is a planar structure attached to the cylinder receiver 98 by way of a plurality of fasteners 100. A second mounting location 102 may be provided for specific applications.

As shown in the example of FIG. 7, the connector 56 is coupled to a connector bracket 104 also affixed to the cylinder receiver 98. In one example, a second cable cover 106 extends between the connector bracket 104 and a cover bracket 108. The cable core 62 extends beyond the cover bracket 108 and terminates at a core bracket 110. In one form, a set screw 112 or equivalent apparatus is utilized to allow for adjustment of the cable core 62 relative to the core bracket 110. Such adjustments are well-known in the art of such connectors. In the example shown, a cable end 114 may be attached to the end of the cable core 62 to aid in adjustment as well as to provide protection to the cable core 62 to avoid fraying. Such cable ends 114 also protect the user as the cut end of the cable core 62 often has small sharp protrusions.

Also shown in FIG. 7, the upper portion of the delivery system 52 is shown in more detail including an adjustment screw 116 for adjustment of the connector 56 relative to the connector bracket 104.

In operation, once mounted as previously described, a user when approached or attacked by an animal may engage pressure upon the user engagement surface 82 moving the cable core 84 in direction 92. This movement will translate down the connector 56 and result in movement of the cable core 62 in direction of travel 118. This movement of the cable core will result in movement of a lever arm 120 being attached to the core bracket 110 in direction of travel 122. In this example, as the lever arm 120 is relatively long when measured from the pivot 124 to the cable core 62 relative to the angular degree of travel, the movement in direction of travel 122 will be slightly arcuate. As the lever arm 120 requires a small angle of movement, the movement at the center part 128 and core bracket 110 will appear locally as substantially linear. This movement of the lever arm 120 will result in movement in direction of travel 126 at the center portion 128 of the lever arm 120 in substantially the same direction, but with a smaller radius of arc than encountered at the core bracket 110. In the example shown, release of pressure upon the user engagement surface 82 will result in movement opposing these directions due to biasing by way of the compression spring 128. As shown in this example, the compression spring 128 is provided around a portion of the cable core 62 and is held in place upon the cover bracket 108 by a detent 130 and is held against the outward end of the lever arm 120 highway of a detent 132. This will result in biasing of the lever arm 120 in opposition to direction 122. In other examples, the canister valve 140 may provide the biasing force.

Figure 6:
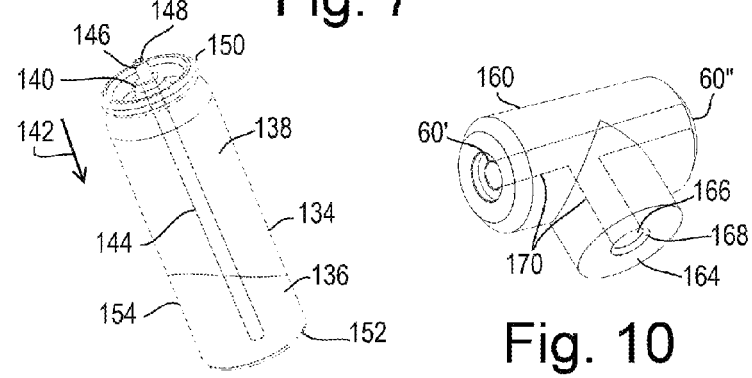
FIG. 6 is a detail view of one example of the pressurized canister portion of the system shown in FIG. 1.

Looking to FIG. 6 is shown a pressurized canister 134 at least partially filled with a deterrent fluid 136. In one form, a pressurized gas 138 may be provided such that when a normally closed canister valve 140 is actuated by downward (142) pressure thereupon; the fluid 136 within the canister 134 will be allowed to flow through a canister conduit 144 past the canister valve 140, through a canister outlet 146 having an opening 148 at the end thereof. Normally closed valves are biased to a closed position until force is exerted to open the valve, when pressure is released, the valve again closes. Generally, the canister valve 140 is biased upwards in the direction opposing direction 142 by way of an internal compression spring or equivalent apparatus. Such pressurized canisters 134 are well-known in the arts of fuels, painting applications, etc. In this example, the structure of the pressurized canister 134 includes a lip 150 in the upper edge thereof and a bottom edge 152 at the lower end of the substantially cylindrical container 154.

Figure 8:
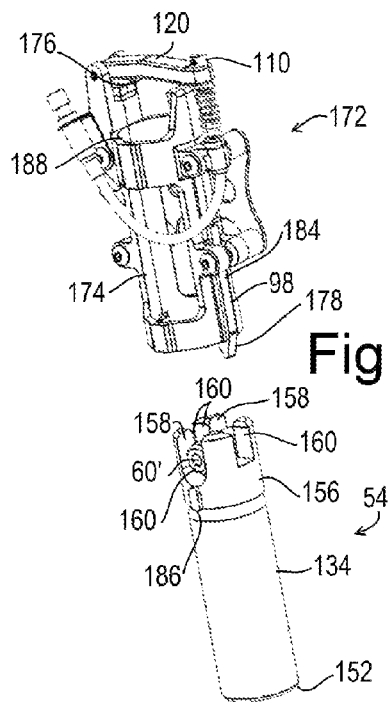
FIG. 8 is a detail view of the delivery system shown in FIG. 5 separated to show the sprayer sub assembly separate from the actuator assembly.

Looking to FIG. 8 it can be seen how this example of the sprayer subassembly 54 includes the pressurized canister 134 as well as a sprayer cap 156. The sprayer cap 156 includes alignment surfaces 160 to aid in alignment of the lever arm 120 which fits there within. The sprayer cap 156 of this example also includes alignment surfaces 158 to maintain position of a sprayer head 160 housing a plurality of spray apertures 60' and 60". When the lever arm 120 is biased downward 122 against the upper surface 162 of the sprayer head 160, the lower surface 164 of the sprayer head 160 is pressed against the canister valve 140. When enough movement is provided, the normally closed valve is opened, allowing the fluid 136 to flow there through into the sprayer head 160 via a conduit receiver 166. As shown in this example, the conduit receiver 166 comprises a chamfered portion 168 to aid in alignment of the canister outlet 146 there into. Generally, the inner surface of the conduit receiver 166 will be substantially the same size as the outer surface of the canister outlet 146 such that substantially all of the fluid 136 and compressed gas 138 flowing into the sprayer head 160 will be diverted by way of internal conduits 170 to the spray apertures 60' and 60". Generally speaking, the spray apertures 60 will have a very small orifice providing a misting effect to the expelled fluid 136 forming a deterrent cloud outward of the vehicle 22 and rider(s) thereupon. As the vehicle 22 is moving through the airspace there around, the cloud will be biased rear word past the legs of the user as well as the frame 32 and I 34 of the vehicle 22 inviting a misting cloud around the lateral sides and rearward portion of the vehicle 22 and rider.

Figure 9:
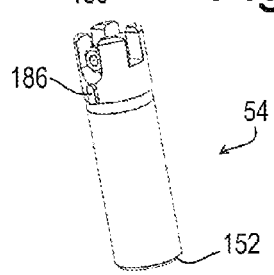
FIG. 9 is a partially exploded view of the delivery system shown in FIG. 5 with several components removed to show the inner components.

To install a sprayer subassembly 54 into an actuator subassembly 172 such that the sprayer cap 156 is engaged upon the lip 150 of the pressurized canister 134. In one form, ridges or detents may be provided on the inner cylindrical surface of the sprayer cap 156 maintain the canister 134 temporarily on the sprayer cap 156. The sprayer head 160 is engaged upon the canister 134 such that the canister outlet 146 fit securely within the conduit receiver 166 and the canister valve 140 is in contact with or nearly in contact with the lower surface 164. This sprayer subassembly 54 is then slid vertically into an internal surface 174 until the sprayer head 160 is in contact with or nearly in contact with a lower surface 176 of the lever arm 120. Additionally, a plurality of canister catches 178 may be provided as best seen in FIG. 9. Each canister catch 178 having a ledge 180 two securely engage the bottom edge 152 of the canister 134 thus holding the sprayer subassembly 54 in position. To aid in insertion, the canister catches 178 may have an angled portion 182 to ease in insertion of the sprayer subassembly 54 there past. In one form the long arms 184 of the canister catches 178 are formed of a spring material to bias them inward toward the outer surface of the canister 134. To further aid in insertion, the sprayer cap 156 may comprise a plurality of alignment detents 186 which engage grooves 188 in the cylinder receiver 98 two align the sprayer cap 156 prior to alignment with the lever arm 120.

To remove the sprayer assembly 54 such as for replacement of the canister 134 or cleaning of the spray apertures 60, the catches 178 are force outward by the user whereupon the sprayer subassembly 54 may drop by way of gravity or by way of additional force therefrom.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

The invention claimed is:

1. An aerosol fluid deterrent system configured to be mounted to a user-powered vehicle driven and provided motile force by a user; the system comprising:
   a pressurized canister containing an animal deterrent fluid under pressure;
   a normally closed valve in fluid connection with the pressurized canister to selectively allow passage of the animal deterrent fluid there through;
   a plurality of spray apertures in fluid communication with the normally closed valve;
   the spray apertures configured to simultaneously direct a fluid mist transversely right and transversely left of the vehicle away from the user;
   wherein the pressurized canister is removably attached to the vehicle at a first location;
   a user actuator mechanically coupled to control the normally closed valve;
   the normally closed valve comprises a mechanical connection to the user actuator which opens the normally closed valve upon actuation of the user actuator;
   wherein the user actuator is removably attached to the vehicle at a second location remote from the first location;
   the pressurized canister is directly and removably attached to a spray cap directly attached to each spray orifice, the combination forming a sprayer subassembly;
   wherein the normally closed valve is directly attached to the spray cap; and
   the sprayer sub assembly is removably coupled to the actuator sub assembly.

2. The aerosol fluid deterrent system as recited in claim 1 wherein the first location is forward of the user.

3. The aerosol fluid deterrent system as recited in claim 1 wherein the first location is at an axle of a wheel of the vehicle.

4. The aerosol fluid deterrent system as recited in claim 3 wherein the first location is at the axle of a front wheel of the vehicle.

5. The aerosol fluid deterrent system as recited in claim 1 wherein the remote actuator comprises a tension cable having a first end attached to the user actuator and a second end attached to the normally closed valve.

6. The aerosol fluid deterrent system as recited in claim 1 wherein at least one of the spray apertures directs a mist fluid through the front wheel of the vehicle.

* * * * *